(12) United States Patent
Salant et al.

(10) Patent No.: US 11,141,962 B2
(45) Date of Patent: Oct. 12, 2021

(54) IMMEDIATE AND HIGH PERFORMANCE FLEXIBLE PACKAGING APPLICATIONS USING THERMAL LAMINATION AND NEW PRIMER TECHNOLOGY

(71) Applicant: HP Indigo B.V., Amstelveen (NL)

(72) Inventors: Asaf Salant, Jerusalem (IL); David Idan, Nes Ziona (IL); Alexander Stolov, Nes Ziona (IL); Einat Glick, Nes Ziona (IL); Roy Lubinski, Nes Ziona (IL); Chen Zigdon, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/310,751

(22) PCT Filed: Jul. 29, 2016

(86) PCT No.: PCT/EP2016/068251
§ 371 (c)(1),
(2) Date: Dec. 17, 2018

(87) PCT Pub. No.: WO2018/019392
PCT Pub. Date: Feb. 1, 2018

(65) Prior Publication Data
US 2019/0193380 A1    Jun. 27, 2019

(51) Int. Cl.
*B32B 27/08* (2006.01)
*B32B 37/15* (2006.01)
(Continued)

(52) U.S. Cl.
CPC ............ *B32B 27/08* (2013.01); *B29D 7/01* (2013.01); *B32B 27/308* (2013.01); *B32B 27/32* (2013.01);
(Continued)

(58) Field of Classification Search
CPC .......... B32B 27/08; B32B 27/308; B29D 7/01
(Continued)

(56) References Cited

U.S. PATENT DOCUMENTS 7,470,736 B2 * 12/2008 Cooper ................. C09J 123/08
524/270
8,247,063 B2 * 8/2012 Holbert ................. B32B 27/327
428/195.1
(Continued)

FOREIGN PATENT DOCUMENTS

EP    2133279    12/2009
ER    0714762    6/1996
(Continued)

OTHER PUBLICATIONS

English Translation of Middleton (CA1201050) (Year: 1982).*
(Continued)

*Primary Examiner* — Matthew J Daniels
*Assistant Examiner* — Hana C Page
(74) *Attorney, Agent, or Firm* — Dierker & Kavanaugh PC

(57) ABSTRACT

A process for preparing a flexible packaging material (6) by laminating at a temperature greater or equal to 50° C. a printed substrate coated with a primer (4) comprising poly (acrylic acid) and/or poly(methacrylic acid) with another substrate coated with a thermal active material (2), to prepare a high performance flexible packaging multilayer material (6) showing improved shelf-life, without requiring curing stage of intermediate layers.

10 Claims, 1 Drawing Sheet

(51) Int. Cl.
  B32B 38/00 (2006.01)
  B32B 27/30 (2006.01)
  B32B 27/32 (2006.01)
  B32B 27/36 (2006.01)
  B29D 7/01 (2006.01)
  B29K 23/00 (2006.01)
  B29K 33/00 (2006.01)
  B29K 67/00 (2006.01)

(52) U.S. Cl.
  CPC ............ B32B 27/36 (2013.01); B32B 37/153 (2013.01); B32B 38/145 (2013.01); B29K 2023/12 (2013.01); B29K 2033/08 (2013.01); B29K 2067/003 (2013.01); B29K 2995/0053 (2013.01); B32B 2255/10 (2013.01); B32B 2307/518 (2013.01); B32B 2439/70 (2013.01)

(58) Field of Classification Search
  USPC ........................................................ 156/242
  See application file for complete search history.

(56) References Cited

U.S. PATENT DOCUMENTS

| 10,213,950 | B2 | 2/2019 | Salant | |
|---|---|---|---|---|
| 10,518,509 | B2 | 12/2019 | Idan | |
| 2007/0113972 | A1* | 5/2007 | Kikuchi | B29C 66/8122 156/289 |
| 2009/0098375 | A1 | 4/2009 | Voisin et al. | |
| 2010/0062274 | A1* | 3/2010 | Leth | B32B 27/10 428/474.4 |
| 2011/0091695 | A1 | 4/2011 | Bevilacqua et al. | |
| 2012/0282476 | A1 | 11/2012 | Lu et al. | |
| 2012/0318807 | A1 | 12/2012 | Leser et al. | |
| 2013/0059119 | A1* | 3/2013 | Campeau | B32B 27/32 428/141 |
| 2015/0227064 | A1 | 8/2015 | Bandriss et al. | |
| 2015/0346621 | A1 | 12/2015 | Breese et al. | |
| 2016/0016390 | A1 | 1/2016 | Lundblad et al. | |
| 2017/0320253 | A1 | 11/2017 | Salant | |
| 2017/0326774 | A1 | 11/2017 | Idan et al. | |
| 2018/0370199 | A1 | 12/2018 | Dabadie | |

FOREIGN PATENT DOCUMENTS

| WO | WO 2009087659 | 7/2009 | |
|---|---|---|---|
| WO | WO-2014044322 A1 * | 3/2014 | ............. B32B 27/08 |
| WO | WO-2014206494 | 12/2014 | |
| WO | WO 2015188844 | 12/2015 | |
| WO | WO 2016050686 | 4/2016 | |
| WO | WO 2016074716 | 5/2016 | |
| WO | WO 2016074717 | 5/2016 | |
| WO | WO 2016074718 | 5/2016 | |
| WO | WO 2017067611 | 4/2017 | |

OTHER PUBLICATIONS

International Search Report, and Written Opinion for International Application No. PCT/EP2016/068251 dated Oct. 21, 2016, 12 pages.

* cited by examiner

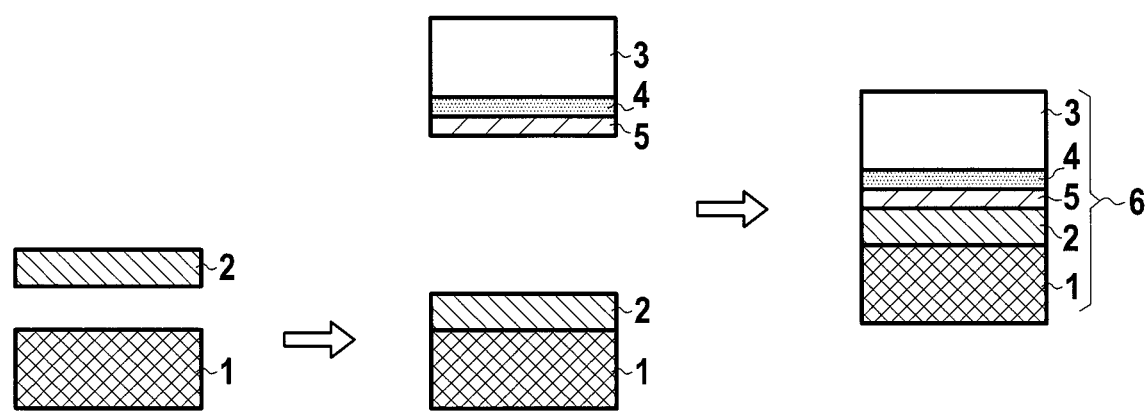

IMMEDIATE AND HIGH PERFORMANCE FLEXIBLE PACKAGING APPLICATIONS USING THERMAL LAMINATION AND NEW PRIMER TECHNOLOGY

All manner of consumer goods, in particular food products, are packaged using thin films or sheets of flexible packaging material, with images such as corporate branding, or product information printed onto the film. The flexible packaging material serves to protect the product from, for example, moisture, oxidation or pathogens, while also providing information to the user regarding the nature and origin of the product contained therein.

BRIEF DESCRIPTION OF THE DRAWING

FIG. 1 shows a schematic of a process for producing a flexible packaging material in accordance with the present disclosure.

DETAILED DESCRIPTION

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, colorant, charge directors and other additives can be dispersed to form a liquid electrostatic composition or a liquid electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is typically suitable for use in an electrostatic printing process, sometimes termed an electrophotographic printing process. It may comprise pigment particles, which may comprise a thermoplastic resin.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

As used herein, "lamination bond strength" refers to the force (per length) required to delaminate a laminated material, and is expressed in units of Newton/inch, or N/in. The lamination bond strength can be measured according to standard techniques, in particular ASTM F0904-98R08. Unless otherwise stated, the lamination bond strength of a flexible packaging material described herein refers the strength to delaminate the material at the interface between a thermally activatable laminating material and either of the two materials to which the thermally activatable laminating material has bonded.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic ink composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity at 140° C., units are mPa·s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic ink composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400 V/μm, or more, in some examples 600-900 V/μm, or more. As used herein, the term "about" is used to provide flexibility to a numerical range endpoint by providing that a given value may be a little above or a little below the endpoint to allow for variation in test methods or apparatus. The degree of flexibility of this term can be dictated by the particular variable as would be understood in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a process for preparing a flexible packaging material comprising:
providing a first flexible substrate coated with a primer comprising poly(acrylic acid) and/or poly(methacrylic acid);
printing a liquid electrophotographic printing ink composition onto the surface of the first flexible substrate;
extruding a thermally activatable laminating material onto a surface of a second flexible substrate; and
contacting, under conditions of temperature of at least 50° C., the surface of the second flexible substrate on which the thermally activatable laminating material is deposited with the surface of the first flexible substrate printed with the liquid electrophotographic printing ink composition.

In another aspect there is provided a flexible packaging material comprising:
a first flexible substrate coated with a primer comprising poly(acrylic acid) and/or poly(methacrylic acid);
a printed liquid electrophotographic printing ink composition disposed on a surface of the first flexible substrate; and
a second flexible substrate on which a thermally activatable laminating material is deposited, the surface of the second flexible substrate on which a thermally activatable laminating material is deposited being thermally laminated to the surface of the first flexible substrate printed with the ink composition.

In another aspect there is provided a flexible package comprising a flexible packaging material comprising:
a first flexible substrate coated with a primer comprising poly(acrylic acid) and/or poly(methacrylic acid);
a printed liquid electrophotographic printing ink composition disposed on a surface of the first flexible substrate; and
a second flexible substrate on which a thermally activatable laminating material is deposited, the surface of the second flexible substrate on which a thermally activatable laminating material is deposited being thermally laminated to the surface of the first flexible substrate printed with the ink composition.

Much research has been carried out in recent years to try to develop laminated flexible packaging materials comprising a functional (barrier) substrate laminated to a second substrate comprising a printed image or information. Some existing laminated flexible packaging materials have been found to be unsuitable for use in particular circumstances, such as storage of particular items (e.g. food, detergent, chemical), package storage conditions (e.g. humid conditions which may be found in particular geographical locations, or in refrigerators or freezers), and high performance flexible packaging in which packages are required to withstand, for example, processes for extending the shelf life or food such as pasteurization and retort. Printed images or information on some existing laminated flexible packaging materials have been found to discolour on heating, for example on heat sealing of a package or lamination bond strength of some existing laminated flexible packages may be found to decrease on heating causing defects between the layers during thermal processes such as pasteurization and retort. The solutions proposed today consist on applying an adhesive coating on the printed substrate and laminating the coated printed substrate with a second substrate such as film, foil, paper or laminate. Adhesive coatings require a prolonged period of curing (over seven days) to overcome regulatory issues and to allow adhesive coatings to reach maximum strength before moving to the next converting processes. Thus, there is a lag time between a flexible packaging material being produced and the material being ready for packaging food. When used with digital printing processes, conventional laminating technologies negate the advantage of short turnaround on the printing process due to long post-printing processes/wait times.

The present inventors have found that examples of the process as described herein avoid or at least mitigate at least one of the difficulties described above. They have found that examples of the process are more successful than previous processes in that the lamination and bonding is immediate such that no cure time is required (zero cure time). The process described can be implemented in-line with a conventional electrostatic printing process, thus further streamlining the process for producing flexible packaging materials.

Flexible Packaging Material

In one example, a flexible packaging material is described. The flexible packaging material may be produced by any of the methods described herein. Each component of the flexible packaging material will be discussed in the sections which follow.

In one example, the flexible packaging material comprises a laminate structure with sufficient bond strength to avoid delamination of the layers, in particular delamination at the interface between the second flexible substrate on which a thermally activatable laminating material is laminated and the surface of the first flexible substrate printed with the ink composition. In one example, the lamination bond strength is measured directly after the flexible packaging material has cooled to room temperature following lamination, without having been subjected to any curing or rest period following lamination and cooling. In one example, the lamination bond strength is measured according to ASTM F0904-98R08. In one example, the flexible packaging material has a lamination bond strength of at least about 1.0 N/inch, for example at least about 1.5 N/inch, for example at least about 2.0 N/inch, for example at least about 2.5 N/inch, for example at least about 3.0 N/inch, for example at least about 4.0 N/inch, for example at least about 5.0 N/inch, for example at least about 6.0 N/inch, for example at least about 7.0 N/inch, for example at least about 8.0 N/inch, for example at least about 9.0 N/inch, for example about 10.0 N/inch, as measured by ASTM F0904-98R08.

First Flexible Substrate

The flexible substrate, to which the primer comprising poly(acrylic acid) and/or poly(methacrylic acid) is coated and to which a liquid electrophotographic printing ink composition is to be printed may be any material suitable for use in a printing process and suitable for use in a flexible packaging material. Since the first flexible substrate forms the outermost layer of the final, laminated flexible packaging material as prepared in the methods described herein, in one example the flexible substrate is transparent in order that the printed image or information is visible to the consumer.

In one example, the first flexible substrate comprises a film of a polymer, for example a thermoplastic polymer. In one example, the first flexible substrate comprises a film of biaxially oriented polypropylene (BOPP), polyethylene terephthalate (PET), polypropylene (PP) and oriented polyamide (OPA). Other suitable polymers will be known in the art and the examples provided above should be seen as non-limiting examples only.

In one example, the first flexible substrate comprises a thin film of a polymer, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In one example, the film of polymer is about 10 µm in thickness.

In one example, the first flexible substrate comprises a thin film of a polymer, wherein the film is greater than 10 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In one example, the film of polymer is about 100 µm in thickness.

The first flexible substrate has a surface on which a primer comprising poly(acrylic acid) and/or poly(methacrylic acid) is disposed, the ink composition being then disposed on a surface of the first flexible substrate.

In some examples, the primer comprises poly(acrylic acid).

The primer may comprise a copolyester. The copolyester may be formed when modifications are made to polyesters, which are combinations of diacids and diols. In some examples, the copolyester is formed by introducing other diacids, such as isophthalic acid, or other diols, such as cyclohexane dimethanol to the polyester. The material becomes a copolyester due to its comonomer content. In some examples, the comonomer content is of 1-50 wt % of the copolyester.

In some examples, the primer comprising poly(acrylic acid) and/or poly(methacrylic acid) on the surface of the flexible print substrate surface is provided in an amount such that the coat weight of the primer comprising poly(acrylic acid) and/or poly(methacrylic acid) on the print substrate is at least 0.01 g/m$^2$, in some examples at least 0.05 g/m$^2$, in some examples at least 0.1 g/m$^2$, in some examples at least 0.15 g/m$^2$, in some examples about 0.18 g/m$^2$. In some examples the primer comprising poly(acrylic acid) and/or poly(methacrylic acid) is provided in an amount such that the coat weight of the primer comprising poly(acrylic acid) and/or poly(methacrylic acid) on the print substrate is up to about 0.2 g/m$^2$, in some examples up to about 0.5 g/m$^2$, in some examples up to about 1 g/m$^2$, in some examples up to about 1.5 g/m$^2$.

In some examples, the first flexible substrate coated with a primer comprising poly(acrylic acid) and/or poly(methacrylic acid) is a Sarafil® product (available from Polyplex). In some examples, the first flexible substrate coated with a primer comprising poly(acrylic acid) and/or poly(methacrylic acid) is a Sarafil® DP product of Polyplex in which the first flexible substrate is a biaxyally oriented polyethylene terephthalate (BOPET) material, such as Sarafil® DP100-1G. In some examples, the first flexible substrate coated with a primer comprising poly(acrylic acid) and/or poly(methacrylic acid) is a Sarafil® DB product of Polyplex in which the first flexible substrate is a biaxyally oriented polypropylene (BOPP) material, such as Sarafil® DB100-1GO.

In some examples, the first flexible substrate is printed with an image or information on a first surface of the first flexible substrate. The image or information may be reverse printed onto the first surface of the substrate with a second surface of the first flexible substrate forming the outermost surface of the flexible packaging material and the printed image or information appearing the right way round when viewed through the second surface of the first flexible substrate. In this way, the printed image or information is embedded within the multi-layer structure of the flexible packaging material and not on the outermost surface, and thus protected from damage.

Ink Composition

The ink composition printed on the first flexible substrate coated with the primer comprising poly(acrylic acid) and/or poly(methacrylic acid) described herein is a Liquid Electrophotographic Printing.

(also referred to herein as a LEP composition) useful in the methods described herein to form flexible packaging materials also described generally comprises a colorant or pigment, a polymer resin and a carrier fluid or liquid. The LEP composition may further comprise one or more additives such as charge directors, charge adjuvants, surfactants, viscosity modifiers, emulsifiers and the like. In some examples, the LEP composition may not contain any pigment, or comprise substantially zero pigment and thus be a pigment-free composition, useful in providing a particular transparent gloss or sheen to a printed substrate.

In some examples, after printing, the LEP composition printed on the first flexible substrate described herein may comprise a reduced amount of carrier liquid compared with the LEP printing composition before printing. In some examples, the LEP composition printed on the first flexible substrate coated with the primer comprising poly(acrylic acid) and/or poly(methacrylic acid) described herein, may be substantially free from carrier liquid. Substantially free from carrier liquid may indicate that the ink printed on the first flexible substrate contains less than 5 wt % carrier liquid, in some examples, less than 2 wt % carrier liquid, in some examples less than 1 wt % carrier liquid, in some examples less than 0.5 wt % carrier liquid. In some examples, the LEP composition printed on the first flexible substrate is free from carrier liquid.

Each of these components of an electrostatic ink composition will be described separately in the subsections which follow.

Colorant

The LEP composition may comprise a colorant. The colorant may be a dye or pigment. The colorant can be any colorant compatible with the liquid carrier and useful for electrophotographic printing. For example, the colorant may be present as pigment particles, or may comprise a resin (in addition to the polymers described herein) and a pigment. The resins and pigments can be any of those commonly used as known in the art. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples the white pigment particle may comprise an alumina-$TiO_2$ pigment.

In some examples, the colorant or pigment particles may have a median particle size or $d_{50}$ of less than 20 µm, for example less than 15 µm, for example less than 10 µm, for example less than 5 µm, for example less than 4 µm, for example less than 3 µm, for example less than 2 µm, for example less than 1 µm, for example less than 0.9 µm, for example less than 08 µm, for example less than 0.7 µm, for example less than 0.6 µm, for example less than 0.5 µm. Unless otherwise stated, the particle size of the colorant or pigment particle and the resin coated pigment particle is determined using laser diffraction on a Malvern Mastersizer 2000 according to the standard procedure as described in the operating manual.

The colorant or pigment particle may be present in the LEP composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the colorant or pigment particle may be present in the LEP composition in an amount of at least 50 wt % of the total amount of resin and colorant or pigment, for example at least 55 wt % of the total amount of resin and colorant or pigment.

Polymer Resin

The LEP composition comprises a polymer resin which may comprise a copolymer of an alkylene monomer and a monomer selected from acrylic acid and methacrylic acid. The polymer resin may be referred to as a thermoplastic polymer. A thermoplastic polymer is sometimes referred to as a thermoplastic resin. In some examples, the polymer resin may comprise one or more of ethylene or propylene acrylic acid copolymers; ethylene or propylene methacrylic acid copolymers; ethylene vinyl acetate copolymers; copolymers of ethylene or propylene (e.g. 80 wt % to 99.9 wt %), and alkyl (e.g. $C_1$ to $C_5$) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. $C_1$ to $C_5$) ester of methacrylic or acrylic acid (e.g. 0.1 wt % to 20 wt %); copolymers of ethylene or propylene (e.g. 70 wt % to 99.9 wt %) and maleic anhydride (e.g. 0.1 wt % to 30 wt %); polyethylene; polystyrene; isotactic polypropylene (crystalline); copolymers of ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %); ethylene-acrylate terpolymers: ethylene-acrylic esters-maleic anhydride (MAH) or glycidyl methacrylate (GMA) terpolymers; ethylene-acrylic acid ionomers and combinations thereof.

The polymer resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer resin having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The polymer resin may comprise a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as Surlyn® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The polymer resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The polymer resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The polymer resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The polymer resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The polymer resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel® 960 (from DuPont), and example of the second polymer is Nucrel® 699 (from DuPont), and an example of the third polymer is A-C® 5120 or A-C® 5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the polymer resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the polymer resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymer resin may comprise two different polymers having acidic side groups that are selected from copolymers of ethylene and an ethylenically unsaturated acid of either acrylic acid or methacrylic acid; or ionomers thereof, such as methacrylic acid and ethylene-acrylic or methacrylic acid copolymers which are at least partially neutralized with metal ions (e.g. Zn, Na, Li) such as Surlyn® ionomers. The polymer resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

The polymer resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a copolymer of a monomer having ester side groups and a monomer having acidic side groups. The polymer may be a copolymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a copolymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the copolymer, in some examples 5% to 40% by weight, in some examples 5% to 20% by weight of the copolymer, in some examples 5% to 15% by weight of the copolymer. The second monomer may constitute 1% to 50% by weight of the copolymer, in some examples 5% to 40% by weight of the copolymer, in some examples 5% to 20% by weight of the co-polymer, in some examples 5% to 15% by weight of the copolymer. The first monomer can constitute 5% to 40% by weight of the copolymer, the second monomer constitutes 5% to 40% by weight of the copolymer, and with the third monomer constituting the remaining weight of the copolymer. In some examples, the first monomer constitutes 5% to 15% by weight of the copolymer, the second monomer constitutes 5% to 15% by weight of the copolymer, with the third monomer constituting the remaining weight of the copolymer. In some examples, the first monomer constitutes 8% to 12% by weight of the copolymer, the second monomer constitutes 8% to 12% by weight of the copolymer, with the third monomer constituting the remaining weight of the copolymer. In some examples, the first monomer constitutes about 10% by weight of the copolymer, the second monomer constitutes about 10% by weight of the copolymer, and with the third monomer constituting the remaining weight of the copolymer. The polymer may be selected from the Bynel® class of monomer, including Bynel 2022 and Bynel 2002, which are available from DuPont.

The polymer having ester side groups may constitute 1% or more by weight of the total amount of the resin polymers, e.g. thermoplastic resin polymers, in the liquid electrophotographic ink composition printed on the print substrate, e.g. the total amount of the polymer or polymers having acidic side groups and polymer having ester side groups. The polymer having ester side groups may constitute 5% or more by weight of the total amount of the resin polymers, e.g. thermoplastic polymers, in some examples 8% or more by weight of the total amount of the resin polymers, e.g. thermoplastic polymers, in some examples 10% or more by weight of the total amount of the resin polymers, e.g. thermoplastic polymers, in some examples 15% or more by weight of the total amount of the resin polymers, e.g. thermoplastic polymers, in some examples 20% or more by weight of the total amount of the resin polymers, e.g. thermoplastic polymers, in some examples 25% or more by weight of the total amount of the resin polymers, e.g. thermoplastic polymers, in some examples 30% or more by weight of the total amount of the resin polymers, e.g. thermoplastic polymers, in some examples 35% or more by weight of the total amount of the resin polymers, e.g. thermoplastic polymers, in the LEP composition printed on the print substrate. The polymer having ester side groups may constitute from 5% to 50% by weight of the total amount of the resin polymers, e.g. thermoplastic resin polymers, in the LEP composition printed on the print substrate, in some examples 10% to 40% by weight of the total amount of the resin polymers, e.g. thermoplastic polymers, in the LEP composition printed on the print substrate, in some examples 5% to 30% by weight of the total amount of the resin polymers, e.g. thermoplastic polymers, in the LEP composition printed on the print substrate, in some examples 5% to 15% by weight of the total amount of the resin polymers, e.g. thermoplastic polymers, in the LEP composition printed on the print substrate, in some examples 15% to 30% by weight of the total amount of the resin polymers, e.g. thermoplastic polymers, in the LEP composition printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, copolymer or copolymers of the thermoplastic resin can in some examples be selected from the Nucrel® family of toners (e.g. Nucrel® 403, Nucrel® 407, Nucrel® 609HS, Nucrel® 908HS, Nucrel® 1202HC, Nucrel® 30707, Nucrel® 1214, Nucrel® 903, Nucrel®

3990, Nucrel® 910, Nucrel® 925, Nucrel® 699, Nucrel® 599, Nucrel® 960, Nucrel® RX 76, Nucrel® 2806, Bynel® 2002, Bynel® 2014, Bynel® 2020 and Bynel® 2022, (sold by DuPont)), the A-C® family of toners (e.g. A-C® 5120, A-C® 5180, A-C® 540, A-C® 580 (sold by Honeywell)), the AClyn® family of toners (e.g. AClyn® 201, AClyn® 246, AClyn® 285 and AClyn® 295), and the Lotader® family of toners (e.g. Lotader® 2210, Lotader® 3430 and Lotader® 8200 (sold by Arkema)).

The polymer resin can constitute about 5 to 90%, in some examples about 50 to 80%, by weight of the solids of the LEP composition printed onto the surface of the first flexible substrate. The resin can constitute about 60 to 95%, in some examples about 70 to 95%, by weight of the solids of the LEP composition printed onto the surface of the first flexible substrate.

Carrier Liquid

In some examples, the LEP composition comprises polymer resin coated pigment particles, or resin particles, which are formed in and/or dispersed in a carrier fluid or carrier liquid. Before application to the print substrate in the electrostatic printing process, the ink composition may be an electrostatic ink composition, which may be in dry form, for example in the form of flowable pigment particles coated with the thermoplastic resin. Alternatively, before application to the print substrate in the electrostatic printing process, the electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In some examples, the carrier liquid is a liquid which does not dissolve the polymer resin at room temperature. In some examples, the carrier liquid is a liquid which dissolves the polymer resin at elevated temperatures. For example, the polymer resin may be soluble in the carrier liquid when heated to a temperature of at least 80° C., for example 90° C., for example 100° C., for example 110° C., for example 120° C. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include hydrocarbons. The hydrocarbon can include an aliphatic hydrocarbon, an isomerized aliphatic hydrocarbon, branched chain aliphatic hydrocarbons, aromatic hydrocarbons, and combinations thereof. Examples of the carrier liquids include aliphatic hydrocarbons, isoparaffinic compounds, paraffinic compounds, dearomatized hydrocarbon compounds, and the like. In particular, the carrier liquids can include Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK).

Before printing, the carrier liquid can constitute about 20% to 99.5% by weight of the electrostatic ink composition, in some examples 50% to 99.5% by weight of the electrostatic ink composition. Before printing, the carrier liquid may constitute about 40 to 90% by weight of the electrostatic ink composition. Before printing, the carrier liquid may constitute about 60% to 80% by weight of the electrostatic ink composition. Before printing, the carrier liquid may constitute about 90% to 99.5% by weight of the electrostatic ink composition, in some examples 95% to 99% by weight of the electrostatic ink composition.

The electrostatic ink composition, when printed onto the surface of the first flexible substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed onto the surface of the first flexible substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed onto the surface of the first flexible substrate is free from carrier liquid.

Charge Director and Charge Adjuvant

The ink composition printed onto the surface of the first flexible substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, for example, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula:

[$R_a$—O—C(O)CH$_2$CH(SO$_3^-$)C(O)—O—$R_b$], where each of $R_a$ and $R_b$ is an alkyl group. In some examples, the charge director comprises nanoparticles of a simple salt and a sulfosuccinate salt of the general formula MA$_n$, wherein M is a metal, n is the valence of M, and A is an ion of the general formula [$R_a$—O—C(O)CH$_2$CH(SO$_3^-$)C(O)—O—$R_b$], where each of $R_a$ and $R_b$ is an alkyl group, or other charge directors as found in WO 2007/130069, which is incorporation herein by reference in its entirety. As described in WO 2007/130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO 2007/130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{3+}$, or from any subgroup thereof. The simple salt may comprise an anion selected from $SO_4^{2-}$, $PO^{3-}$, $NO^{3-}$, $HPO_4^{2-}$, $CO_3^{2-}$, acetate, trifluoroacetate (TFA), $Cl^-$, Bf, F, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a-O-C(O)CH_2CH(SO_3^-)C(O)-O-R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a-O-C(O)CH_2CH(SO_3^-)C(O)-O-R_b]$ and/or the formula $MA_n$ may be as defined in any part of WO 2007/130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples 0.01 to 20% by weight, in some examples 0.01 to 10% by weight, in some examples 0.01 to 1% by weight of the solids of the electrostatic ink composition printed onto the surface of the first flexible substrate. The charge director can constitute about 0.001 to 0.15% by weight of the solids of the liquid electrophotographic ink composition printed onto the surface of the first flexible substrate, in some examples 0.001 to 0.15%, in some examples 0.001 to 0.02% by weight of the solids of the liquid electrophotographic ink composition printed onto the surface of the first flexible substrate. In some examples, the charge director imparts a negative charge on the electrostatic ink composition. The particle conductivity may range from 50 to 500 pmho/cm, in some examples from 200-350 pmho/cm.

The ink composition printed onto the surface of the first flexible substrate can comprise a charge adjuvant. A charge adjuvant may be present with a charge director, and may be different to the charge director, and act to increase and/or stabilise the charge on particles, e.g. resin-containing particles, of an electrostatic composition. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium, and ammonium salts, copolymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic ink composition printed onto the surface of the first flexible substrate. The charge adjuvant can constitute about 0.5 to 4% by weight of the solids of the liquid electrophotographic ink composition printed onto the surface of the first flexible substrate. The charge adjuvant can constitute about 1 to 3% by weight of the solids of the liquid electrophotographic ink composition printed onto the surface of the first flexible substrate.

Other Additives

The electrophotographic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Second Flexible Substrate

The second flexible substrate may also be referred to as a functional substrate or simply a base layer. The base layer of the flexible packaging material may be the innermost layer of the flexible packaging material in use, and may thus be in contact with the packaged goods. In some examples, the base layer is referred to as a functional substrate and is functional in the sense that it provides a barrier function to protect the packaged goods. The base layer or functional substrate may serve as a barrier to any external influence that could damage or otherwise reduce the quality of the packaged goods, in particular food, by preventing ingress of, for example, moisture, oxygen, other oxidants and pathogens such as viruses and bacteria.

In some examples, the second flexible substrate comprises a thin film or thin sheet of paper, metallic foil, and/or a plastic material. In some examples, the second flexible substrate comprises a metallic foil or a metallized substrate. In some examples, the second flexible substrate comprises an aluminium foil. In some example, the second flexible substrate comprises a thin film of a plastic material, for example, polyethylene (PE), linear low density polyethylene (LLDPE), low density polyethylene (LDPE), medium density polyethylene (MDPE), high density polyethylene (HDPE), polypropylene (PP), cast (cPP) or axially oriented polypropylene (BOPP), oriented polyamide (OPA). In some examples, the second flexible substrate comprises a plurality of layers of film of a plastic material, such as a combination of films selected from PE, LLDPE, PP, BOPP, OPA, Al, metalized BOPP, metalized PET, laminated together.

In some examples, the second flexible substrate comprises a metallized paper in the form of a paper substrate coated on one surface with a layer of metal, for example aluminium.

In some examples, the second flexible substrate comprises a metallized plastic film in the form of a polymer substrate coated on one surface with a layer of metal, for example aluminium. In some examples, the second flexible substrate comprises a metallized plastic film in the form of a metallized BOPP film, a metallized PET film, or a metallized polyethylene (PE) film. In some examples, the metallized PET or PE is coated with a SiOx or AlOx layer.

In some examples, the second flexible substrate comprises a thin film of material, wherein the film is less than 250 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In one example, the film of material is about 12 μm in thickness.

In some examples, the second flexible substrate comprises a thin film of material, wherein the film is greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In some examples, the film of material is about 250 μm in thickness.

In some examples, the second flexible substrate comprises a sealant layer disposed on a surface thereof other than the surface on which the thermally activatable laminating material is applied, and thus on which the first flexible substrate printed with the ink composition is laminated. In some examples, the sealant layer is disposed on the innermost surface of the flexible packaging material and serves to provide means for sealing the flexible packaging material to itself or another material, with the goods to be packaged inside. In some examples, the sealant layer comprises a film of low-melting, i.e. heat sealable, thermoplastic material. Suitable thermoplastic materials include those described herein in connection with the polymer resin and/or the thermally activatable laminating material and include polymers of ethylene, or DuPont's Surlyn® ionomers. In one example, the sealant layer comprises an extrudable material.

In some examples, the sealant layer comprises a thin film of a polymer, wherein the film is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In some examples, the film of polymer is about 5 μm in thickness.

In some examples, the sealant layer comprises a thin film of a polymer, wherein the film is greater than 5 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In one example, the film of polymer is about 100 μm in thickness.

Thermally Activatable Laminating Material (TALM)

The thermally activatable laminating material may also be referred to as a thermal laminating material or layer or polymer or thermally activatable laminating layer or polymer.

In some examples, the thermally activatable laminating material comprises a polymer resin, for example a thermoplastic polymer resin. In some examples the thermally activatable laminating material comprises a low-melting polymer. The term "low-melting polymer" is to be understood as a polymeric material which is solid at room temperature but melts at a temperature typically obtainable in a printing or laminating apparatus.

In some examples, the thermally activatable laminating material may comprise a low-melting polymer with a melting point of less than about 200° C., for example less than about 190° C., for example less than about 180° C., for example less than about 170° C., for example less than about 160° C., for example less than about 150° C., for example less than about 140° C., for example less than about 130° C., for example less than about 120° C., for example less than about 110° C., for example less than about 100° C., for example less than about 90° C., for example less than about 80° C., for example about 70° C.

In some examples, the thermally activatable laminating material may comprise a low-melting polymer with a melting point of greater than about 70° C., for example greater than about 80° C., for example greater than about 90° C., for example greater than about 100° C., for example greater than about 110° C., for example greater than about 120° C., for example greater than about 130° C., for example greater than about 140° C., for example greater than about 150° C., for example greater than about 160° C., for example greater than about 170° C., for example greater than about 180° C., for example greater than about 190° C., for example about 200° C.

By using a low-melting polymer as the thermally activatable laminating material to form the thermally activatable laminating material, it becomes possible to extrude the thermally activatable laminating material onto the second flexible substrate to form a layered structure for laminating to the printed substrate.

In some examples, the thermally activatable laminating material comprises a thin film of a polymer, wherein the film is less than 180 μm in thickness, for example less than 160 μm in thickness, for example less than 140 μm in thickness, for example less than 120 μm in thickness, for example less than 100 μm in thickness, for example less than 80 μm in thickness, for example less than 60 μm in thickness, for example less than 50 μm in thickness, for example less than 40 μm in thickness, for example less than 30 μm in thickness, for example less than 20 μm in thickness, for example less than 10 μm in thickness, for example less than 9 μm in thickness, for example less than 8 μm in thickness, for example less than 7 μm in thickness, for example less than 6 μm in thickness, for example less than 5 μm in thickness, for example less than 4 μm in thickness, for example less than 3 μm in thickness. In some examples, the film of polymer is about 2 μm in thickness.

In some examples, the thermally activatable laminating material comprises a thin film of a polymer, wherein the film is greater than 2 μm in thickness, for example greater than 3 μm in thickness, for example greater than 4 μm in thickness, for example greater than 5 μm in thickness, for example greater than 6 μm in thickness, for example greater than 7 µm in thickness, for example greater than 8 µm in thickness, for example greater than 9 µm in thickness, for example greater than 10 µm in thickness, for example greater than 20 µm in thickness, for example greater than 30 µm in thickness, for example greater than 40 µm in thickness, for example greater than 50 µm in thickness, for example greater than 60 µm in thickness, for example greater than 80 µm in thickness, for example greater than 100 µm in thickness, for example greater than 120 µm in thickness, for example greater than 140 µm in thickness, for example greater than 160 µm in thickness. In some examples, the film of polymer is about 180 µm in thickness.

In some examples, the thermally activatable laminating material comprises a thin film of a polymer, wherein the film has a coating weight of less than 160 grams per square metre (gsm), for example less than 150 gsm, for example less than 140 gsm, for example less than 130 gsm, for example less than 120 gsm, for example less than 110 gsm, for example less than 100 gsm, for example less than 90 gsm, for example less than 80 gsm, for example less than 70 gsm, for example less than 60 gsm, for example less than 50 gsm, for example less than 40 gsm, for example less than 30 gsm, for example less than 20 gsm, for example less than 15 gsm, for example less than 10 gsm, for example less than 9 gsm, for example less than 8 gsm, for example less than 7 gsm, for example less than 6 gsm, for example less than 5 gsm, for example less than 4 gsm, for example less than 3 gsm. In one example, the weight of the film of polymer is about 2 gsm.

In some examples, the thermally activatable laminating material comprises a thin film of a polymer, wherein the film is greater than 2 gsm in weight, for example greater than 3 gsm, for example greater than 4 gsm, for example greater than 5 gsm, for example greater than 6 gsm, for example greater than 7 gsm, for example greater than 8 gsm, for example greater than 9 gsm, for example greater than 10 gsm, for example greater than 15 gsm, for example greater than 20 gsm, for example greater than 30 gsm, for example greater than 40 gsm, for example greater than 50 gsm, for example greater than 60 gsm, for example greater than 70 gsm, for example greater than 80 gsm, for example greater than 90 gsm, for example greater than 100 gsm, for example greater than 110 gsm, for example greater than 120 gsm, for example greater than 130 gsm, for example greater than 140 gsm, for example greater than 150 gsm. In one example, the weight of the film of polymer is about 160 gsm.

In some examples, the thermally activatable laminating material may be a polymer selected from ethylene or propylene acrylic or methacrylic acid copolymers; ethylene or propylene methacrylic acid copolymers; ethylene vinyl acetate copolymers; copolymers of ethylene or propylene (e.g. 80 wt % to 99.9 wt %), and alkyl (e.g. $C_1$ to $C_5$) ester of methacrylic or acrylic acid (e.g. 0.1 wt % to 20.0 wt %; co-polymers of ethylene or propylene (e.g. 80 wt % to 99.9 wt %), acrylic or methacrylic acid (e.g. 0.1 wt % to 20.0 wt %) and $C_1$-$C_5$alkyl ester of methacrylic or acrylic acid (e.g. 0.1 wt % to 20.0 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); copolymers of ethylene ethyl acrylate; polyesters; polyvinyl toluene; polyamides; styrene/butadiene copolymers; epoxu resins; acrylic resins (e.g. copolymer of acrylic or methacrylic acid and at least one $C_1$-$C_{20}$alkyl ester of acrylic or methacrylic acid, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers, urethane polymers and combinations thereof.

The thermally activatable laminating material may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 170 mg or less, in some examples 160 mg or less, in some examples 150 mg or less, in some examples 140 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The thermally activatable laminating material may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as Surlyn® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The thermally activatable laminating material may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The thermally activatable laminating material may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups. The ratio of the first polymer having acidic side groups to the second polymer having acidic side groups can be from about 10:1 to about 2:1. The ratio can be from about 6:1 to about 3:1, in some examples about 4:1.

The thermally activatable laminating material may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel® 960 (from DuPont), and example of the second polymer is Nucrel® 699 (from DuPont), and an example of the third polymer is A-C® 5120 or A-C® 5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the thermally activatable laminating material comprises a single type of polymer, the polymer may have a melt viscosity of 6000 poise or more, in some examples a melt viscosity of 8000 poise or more, in some examples a melt viscosity of 10000 poise or more, in some examples a melt viscosity of 12000 poise or more. If the thermally activatable laminating material comprises a plurality of polymers all the polymers may together form a mixture that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The thermally activatable laminating material may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as Surlyn® ionomers. The thermally activatable laminating material may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the co-polymer, in some examples from 16 wt % to about 20 wt % of the copolymer in some examples from 17 wt % to 19 wt % of the copolymer.

The thermally activatable laminating material may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a copolymer of a monomer having ester side groups and a monomer having acidic side groups. The polymer may be a copolymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons, in some examples 1 to 5 carbons; in some examples selected from methyl, ethyl, iso-propyl, n-propyl, t-butyl, iso-butyl, n-butyl and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a copolymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the copolymer, in some examples 5% to 40% by weight, in some examples 5% to 20% by weight of the copolymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel® 2022 and Bynel® 2002, which are available from DuPont.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, copolymer or copolymers of the thermally activatable laminating material can in some examples be selected from the Nucrel® family of polymers (e.g. Nucrel® 403, Nucrel® 407, Nucrel® 609HS, Nucrel® 908HS, Nucrel® 1202HC, Nucrel® 30707, Nucrel® 1214, Nucrel® 903, Nucrel® 3990, Nucrel® 910, Nucrel® 925, Nucrel® 699, Nucrel® 599, Nucrel® 960, Nucrel® RX 76, Nucrel® 2806, Bynel® 2002, Bynel® 2014, Bynel® 2020 and Bynel® 2022 (sold by DuPont)), the AC family of polymers (e.g. A-C® 5120, A-C® 5180, A-C® 540, A-C® 580 (sold by Honeywell)), the AClyn® family of polymers (e.g. Aclyn® 201, Aclyn® 246, Aclyn® 285 and Aclyn® 295), the Lotader® family of polymers (e.g. Lotader® 2210, Lotader® 3430 and Lotader® 8200 (sold by Arkema)), the Lotryl® family of polymers (e.g. Lotryl® 24MA02, 29MA03 and 17BA07 (sold by Arkema)), the Escor family of polymers (e.g. Escor 5020 7.5% (sold by Exxon Mobil), the Tafmer™ family of polymers (e.g. Tafmer™ MA9015 (sold by Mitsui)) and the Surlyn® family of polymers (e.g. Surlyn® 1652 (sold by DuPont)).

Process for Preparing the Flexible Packaging Material

Described herein is a process for preparing a flexible packaging material comprising:
  providing a first flexible substrate coated with a primer comprising poly(acrylic acid) and/or poly(methacrylic acid);
  printing a liquid electrophotographic printing ink composition onto the surface of the first flexible substrate;
  extruding a thermally activatable laminating material onto a surface of a second flexible substrate; and
  contacting, under conditions of temperature of at least 50° C., the surface of the second flexible substrate on which the thermally activatable laminating material is deposited with the surface of the first flexible substrate printed with the liquid electrophotographic printing ink composition.

The process described herein is depicted generally in FIG. 1, in which the following reference numerals are used to identify the features indicated: reference numeral "1" denotes a second flexible substrate; reference numeral "2" denotes a thermally activatable laminating material; reference numeral "3" denotes a first flexible substrate; reference "4" denotes a primer comprising poly(acrylic acid) and/or poly(methacrylic acid); reference numeral "5" denotes an ink composition and reference numeral "6" denotes a flexible packaging material.

FIG. 1 depicts a process in which a second flexible substrate 1 is coated with a thermally activatable laminating material 2, in a deposition process. The thermally activatable laminating material 2 is then contacted with a first surface of a first flexible substrate 3 comprising a primer comprising poly(acrylic acid) and/or poly(methacrylic acid) 4 and an ink composition 5 in a thermal laminating step to form a flexible packaging material 6. Each step of the process will be described in more detail below.

In some examples, a process for preparing a flexible packaging material comprises a step of printing an ink composition onto a first surface of a first flexible substrate coated with a primer comprising poly(acrylic acid) and/or poly(methacrylic acid), or providing a first flexible substrate comprising a first surface coated with a primer comprising poly(acrylic acid) and/or poly(methacrylic acid) and an ink composition printed onto the first surface of the first flexible substrate. In some examples, the first flexible substrate is a first flexible substrate as described herein previously. In some examples, the ink composition used in the process is an ink composition as described herein previously. The ink composition may be printed onto the first surface of the first flexible substrate in a conventional electrophotographic or electrostatic printing process using a conventional electrophotographic or electrostatic printing apparatus. Examples of suitable electrophotographic or electrostatic printing equipment are the HP Indigo digital presses.

In some examples, the first flexible substrate comprises a transparent material and the ink composition is printed onto the first surface of the first flexible substrate thereof in a reverse printing process such that the printed image or information appears correct when viewed through the flexible substrate. By using the reverse printing process, and thermally laminating the printed surface of the first flexible substrate to the second flexible substrate (as described below), the printed image or information is viewed correctly in the final product and is protected from damage by the first flexible substrate which forms the outermost layer of the packaging material. The first flexible substrate comprising the printed image or information can be wound onto a roll or spool and stored until the laminating step is carried out, if required.

In some examples, a process for preparing a flexible packaging material comprises a step of extruding a thermally activatable laminating material onto a first surface of a first flexible substrate coated with a primer comprising poly(acrylic acid) and/or poly(methacrylic acid) to form a thermally activatable laminating material disposed on the first surface of the first flexible substrate, or providing a second flexible substrate with a thermally activatable laminating material extruded onto the first surface of the second flexible substrate. The term "extrusion", as used herein, is to be understood as meaning melting the thermally activatable laminating material and passing it through an extrusion die onto a base layer material in such a manner that the materials form a structure, for example a film, of defined layers of different materials. Such processes and machinery for producing such materials are known in the art.

In some examples, the second flexible substrate is a second flexible substrate as described previously. In some examples, the base material or the base layer is a preformed base layer. In some examples, the thermally activatable laminating material is a thermally activatable laminating material as described previously.

The step of extrusion of the thermally activatable laminating substrate onto the surface of the second flexible substrate to form a layered structure can be performed using any apparatus suited to extrusion processes in which one material is extruded onto a base layer to form layered films. Such machinery is known in the art. In the example in which the thermally activatable laminating material comprises a blend of materials, each component of the thermally activatable laminating material may be melt blended and then extruded to form pellets of blended thermally activatable laminating material. These pellets may then be used in the extrusion step to form a thermally activatable laminating material disposed on the second flexible substrate. In an alternative example, the thermally activatable laminating material may comprise a blend of materials, the blend being achieved by dry blending pellets of each component and adding the mixture of pellets to the extruding machine used to extrude the thermally activatable laminating material and form the layered structure of a thermally activatable laminating material disposed on the second flexible substrate. In one example, the process may further comprise deposition of a sealant material to form a sealant layer disposed on a surface of the second flexible substrate other than the surface on which the thermally activatable laminating material is disposed. The material used to form the sealant layer may be as described previously. The step of depositing the sealant material onto the second flexible substrate may occur before or after the step of extruding the thermally activatable laminating material. The step of depositing the sealant layer may take place by any suitable process, for example, extrusion coating, flexo coating, gravure or screen printing. Thus, in this example, the steps of extruding a thermally activatable laminating material and depositing a sealant layer result in a multi-layer or trilayer material being obtained in which the second flexible substrate has a thermally activatable laminating material disposed on a first surface and a sealant layer disposed on a surface other than the first surface. In one example, the second flexible substrate and sealant layer are pre-formed as a functional substrate.

In some examples, a process for preparing a flexible packaging material comprises a step of contacting under conditions of temperature greater or equal to 50° C. the thermally activatable laminating material with the first surface of the first flexible substrate coated with a primer comprising poly(acrylic acid) and/or poly(methacrylic acid) and comprising the ink composition. This step may be referred to as a laminating step or a thermal laminating step. The result of this step is a thermally laminated flexible packaging material, which, as mentioned previously, comprises the first flexible substrate as the intended outermost layer of the packaging in use, thus protecting from damage the printed image or information formed by the ink composition. In some examples, the first flexible substrate coated with a primer comprising poly(acrylic acid) and/or poly(methacrylic acid) and comprising the printed image or information is brought into a particular alignment with the second flexible substrate comprising the thermally activatable laminating material before being subjected to the thermal laminating step.

In one example, the step of contacting under conditions of temperature greater or equal to 50° C. the thermally activatable laminating material with the first surface of the first flexible substrate comprising the printed ink composition produces the flexible packaging material which is ready for use immediately upon cooling to room temperature, even when using thickener materials. Thus, in some examples, the processes for preparing a flexible packaging material described herein require no additional curing time, or stated differently, zero curing time. The presently described processes are therefore advantageous over existing methods for producing flexible packaging materials containing LEP printed images or information in which laminating adhesives are used. Such laminating adhesives, both "solvent-based" and "solvent-free" adhesives require curing times of at least several days, thus removing the advantage of speed that digital printing can offer. The presently described processes are also advantageous over existing methods for producing flexible packaging materials such as zero cure time pouches for sterilization, hot fill, pasteurization and retort.

In some examples, a process for preparing a flexible packaging material comprises a step of contacting under conditions of temperature greater or equal to 50° C. the thermally activatable laminating material of the second flexible substrate with the first surface of the first flexible substrate and comprising the printed ink composition, and a step of cooling the resulted material to room temperature, thereby obtaining a ready-to-use flexible packaging material.

In some examples, the laminating step may be carried out on any apparatus suited for performing such a task. Suitable laminating equipment for preparing flexible packaging comprising laminated materials is known in the art. The laminating apparatus on which the thermal laminating step may be carried out may comprise pre-heating rolls, heating or nip rolls, and chill or cooling rolls through which the thermally laminated multilayer material passes, to further speed up the cooling process. The laminating step carried out on the nip roll may be carried out at a temperature greater or equal to 50° C. to partially melt the thermally activatable laminating material and/or the polymer resin of the ink composition printed on the first flexible substrate at the laminating nip, and thereby creating a bond between the materials.

In some examples, the temperature for the laminating nip or step may be less than about 180° C., for example less than about 170° C., for example less than about 160° C., for example less than about 150° C., for example less than about 140° C., for example less than about 130° C., for example less than about 120° C., for example less than about 110° C., for example less than about 100° C., for example less than about 90° C., for example less than about 80° C., for example less than about 70° C., for example less than about 60° C. In some examples, the temperature for the laminating nip or step may be greater than about 50° C., for example greater than about 60° C., for example greater than about 70° C., for example greater than about 80° C., for example greater than about 90° C., for example greater than about 100° C., for example greater than about 110° C., for example greater than about 120° C., for example greater than about 130° C., for example greater than about 140° C., for example greater than about 150° C., for example greater than about 160° C., for example greater than about 170° C. In some examples, the temperature for the laminating nip is of 50-180° C. It will be understood that the temperature required for efficient thermal lamination will depend on the nature or composition of the thermally activatable laminating material and/or the polymer resin of the ink composition and the associated melting temperatures.

In some examples, the surface of the first flexible substrate printed with the ink composition is contacted with the surface of the second flexible substrate on which a thermally activatable laminating material is disposed for a period of 100-600 ms.

In some examples, the pressure for the laminating nip or step may be less than about 10 bar, for example less than about 9 bar, for example less than about 8 bar, for example less than about 7 bar, for example less than about 6 bar, for example less than about 5 bar, for example less than about 4 bar, for example less than about 3 bar, for example about 2 bar.

In one example, the pressure for the laminating nip or step may be greater than about 2 bar, for example greater than about 3 bar, for example greater than about 4 bar, for example greater than about 5 bar, for example greater than about 6 bar, for example greater than about 7 bar, for example greater than about 8 bar, for example greater than about 9 bar, for example about 10 bar. It will be understood that the pressure required for efficient thermal lamination will depend on the nature or composition of the thermally activatable laminating material and the associated melting temperature.

EXAMPLES

The following illustrates examples of the methods and related aspects described herein. Thus, these examples should not be considered as limitations of the present disclosure, but are merely in place to teach how to make examples of the present disclosure. As such, a representative number of compositions and their method of manufacture are disclosed herein.

Preparation of the Second Flexible Substrate on which a Thermally Activatable Laminating Material is Deposited Polymer Resins:

Lotryl® 24MA02 is an ethylene-methyl acrylate copolymer (EMA), available from Arkema. Lotryl® 29MA03 is an ethylene-methyl acrylate copolymer (EMA), available from Arkema. Lotryl® 24MA02 is an ethylene-methyl acrylate copolymer (EMA), available from Arkema. Lotader® 3430 is an ethylene-acrylic ester-maleic anhydride terpolymer, available from Arkema.

Tafmer® MA9015 is an acid modified polyolefin, available from Mitsui.

Second Flexible Substrate:

Al foil (7 μm) used was a commercially available material obtained from VAW Hydro under product codes 8079AA or 1200 AA;

BOPA (15 μm) used was a commercially available material obtained from Xiamen Changsu Industry, China;

cPP (80 μm) used was a commercially available material obtained from Etimex, Germany;

cPP (70 μm) used was a commercially available material obtained from Polifilm, Germany;

Polyethylene (PE) used was a commercially available material obtained from Flexfilm, Germany;

Metalized BOPP (20 μm) (Met-BOPP) used was a commercially available material obtained from Flexfilm;

PET (12 μm) used was a commercially available material obtained from Polifilm;

PET-SiOx (12 μm) used was a commercially available material obtained from Amcor Swiss;

PET-AlOx (12 μm) used was a commercially available material obtained from Toray Japan;

BOPP (20 μm) used was a commercially available material obtained from Dor Film.

Adhesive for pre-lamination of second flexible substrate: Dow Adcote 811+catalyst F-9.

Lamination of materials to form the second flexible substrate:

Apparatus: UTECO MISTRAL [1260 mm width] Coating/Laminating machine

TABLE 1

Parameters for lamination of materials to form the second flexible substrate

| Parameter | Value |
|---|---|
| Unwinder A tension (N) | 6 |
| Unwinder B tension (N) | 10 |
| Rewinder Tension (N) | 23 |
| Nip temperature (° C.) | 60 |
| Nip pressure (bar) | 4 |
| Lamination speed (m/min) | 40 |
| Corona A (W) | 0 |
| Corona B (W) | 2000 |
| Room temperature (° C.) | 15-35 |
| Room humidity (%) | 30-80 |
| Dr blade pressure (bar) | 4 |
| Gravure type | 60-70 |
| Oven 1 Temperature (° C.) | 70 |
| Oven 2 Temperature (° C.) | 85 |
| Oven 3 Temperature (° C.) | 100 |
| Adhesive coat weight (gsm) | 3.5 |

1. Upload first substrate on unwinder A
2. Upload second substrate on unwinder B
3. Put adhesive (ADH) in the tray
4. Warm up the oven
5. Operate the speed and close the coating head NIP
6. Operate the corona to 2000 watt
7. Reach 100 m/min speed and close the nip for lamination
8. Remove a sample and measure the coat weight, reach at least 3.5 gsm
9. Finish lamination and cure finished roll
10. The prelaminate is ready to use for the extrusion coating step Extrusion coating of Thermally Activatable Laminating Material (TALM):

Apparatus: Coex Extrusion laminator & Coater MODEL EXCOL1-12/35 from Dolci Extrusion SRL The prelaminate Al (7 µm)/ADH/BOPA (15 µm)/ADH/cPP (80 µm) was loaded onto the main unwinder, and the thermally activatable laminating material was loaded into the extruder, and the apparatus operated according to the parameters set out in Table 2:

TABLE 2

| Parameter | Value |
|---|---|
| Unwinder A tension (N) | 11 |
| Unwinder B tension (N) | 9 |
| Rewinder Tension (N) | 28 |
| Chill roll temperature (° C.) | 60 |
| Corona Tr (W) | 2000 |
| Die temperature (° C.) | 275 |
| Die height (mm) | 230 |
| Extruder A temperature (° C.) | 270 |
| RPM (A, B, C) | 66 |
| Die pressure (bar) | 140 |
| Nip pressure (bar) | 5 |
| Pressure roll temperature (° C.) | 120 |
| Lamination speed (m/min) | 240 |
| Corona Rewinder (W) | 4500 |

The result of the above processes is a prelaminate of thermally activatable laminating material as a top layer of a multilayer material in the form TALM (10 µm)/Al (7 µm)/ADH/BOPA (15 µm)/ADH/cPP (80 µm). This laminate is further laminated to a printed first flexible substrate PET/primer comprising poly(acrylic acid) and/or poly(methacrylic acid)/ink composition as described below.

All the prelaminates exemplified and tested in Table 6 were prepared and coextruded according to the same procedure as described above.

Preparation of the First Flexible Substrate

A first flexible substrate coated with a primer comprising poly(acrylic acid) and/or poly(methacrylic acid) on a surface of the first flexible substrate to which an ink composition was printed was used: the Sarafil® DP100-1G and Sarafil® DB100-1G0 products (available from Polyplex).

An image was electrostatically printed using a HP Indigo 20000 printing press and ElectroInk® 4.5 (available from HP Indigo), a liquid electrophotographic ink composition comprising a thermoplastic resin comprising ethylene acrylic acid, ethylene methacrylic acid copolymers, on the PET film, the image included white and non-printed areas, the printed areas having an ink coverage of 100-350% (1.0 gsm-4.0 gsm coat weight of the thermoplastic resin on the PET film).

TABLE 3

| Print substrate definitions | | |
|---|---|---|
| | PET | BOPP |
| Type | Film | Film |
| Material | PET | BOPP |
| Face-stock | Transparent | Transparent |
| Gloss level | Semi-matte | Semi-matte |
| Second transfer (kg) | 250 | 250 |
| Blanket temperature (° C.) | 105 | 105 |
| Feed Fan (V) | 8 | 8 |
| PTH (° C.) | Off | Off |
| Thickness (µm) | 12 | 20 |

Print Procedure 1.1. Install the required substrate and measure surface energy on outer side with dyne pens
1.2. Change printing machine definitions according to tables above
1.3. Perform $1^{st}$ and $2^{nd}$ transfer calibrations
1.4. Perform full color adjustment and measure OD values with X-Rite with target OD values in Table 5
1.5. Print job
1.6. After printing remove roll to laminator for the next step

TABLE 4

| | Target OD values | | | | |
|---|---|---|---|---|---|
| | Y | M | C | K | W |
| Target OD values | 0.95 ± 0.05 | 1.3 ± 0.05 | 1.3 ± 0.05 | 1.5 ± 0.05 | 0.38 ± 0.05 |
| X-rite screen | Y | M | C | K | C |

Thermal Lamination Process

In this process the printed first flexible substrate coated with a primer comprising poly(acrylic acid) and/or poly(methacrylic acid) is thermally laminated to the second flexible substrate on which the thermally activatable laminating material is deposited.

1. Place printed substrate in unwinder A and second substrate in unwinder B, allow laminator nip to reach the required temperature
2. Operate the laminator for thermal lamination
3. Complete lamination and follow sample measurements
4. Final film configuration is: PET/primer comprising poly(acrylic acid) and/or poly(methacrylic acid)/INK/TALM/Al/OPA/cPP

TABLE 5

| Operating parameters for thermal lamination | |
|---|---|
| Parameter | Value |
| Unwinder A Tension (N) | 9 |
| Unwinder B Tension (N) | 5 |
| Rewinder Tension (N) | 16 |
| Nip temperature (° C.) | 140 |
| Nip pressure (bar) | 5 |
| Lamination speed (m/min) | 15 |
| Corona A (KW) | 2 |
| Corona B (KW) | 2 |

Results

Lamination Bond Strength at Room Temperature

The laminate performance was verified at zero cure time by measuring the lamination bond strength immediately after the flexible packaging material had been cooled at room temperature. Lamination bond strength was measured according to ASTM F0904-98R08.

The results are shown in Table 6 below.

Resistance to deep freeze at −18° C.

The resistivity of the flexible packaging material at a temperature below 0° C. was also verified. The deep freeze test was done by preparing 200×100 mm package from the laminate. The package was manufactured from the flexible packaging material as follows:

the package was sealed at three extremities
the pouch was filled with 300 mL of water at room temperature and sealed at the fourth extremity immersed in 300 mL of water at 21° C. and placed in a freezer at −18° C. for seven days
the package was out to room temperature 23-28° C. for 48 hours
the pasteurized package put into carton box.
The package was then visually inspected for detection of:
any detachments between layers which usually would show as "bubbles" on the surface of the package,
change in the colors of the printed picture taking as reference a non-tested sample,
delaminations,
clear separation between layers,
leaks of fluid from the package through sealing border or/and through the film itself
lamination bond strength after the deep freeze test was measured according to ASTM F0904-98R08. The results are shown in Table 6 below.

Hot Fill Up to 99° C.

Hot fill is a sterilization process that is used for many applications. For the relevant laminates construction, hot fill test was done by preparing 200×100 mm package from the laminate. The package was manufactured from the flexible packaging material as follows:
the package was sealed at three extremities
the pouch was filled with 300 mL of hot water at 99° C. and sealed at the fourth extremity
the package was out to room temperature 23-28° C. for 24 hours
the hot filled package put into carton box
The package was then visually inspected for detection of:
any detachments between layers which usually would show as "bubbles" on the surface of the package,
change in the colors of the printed picture taking as reference a non-tested sample,
delaminations,
clear separation between layers,
leaks of fluid from the package through sealing border or/and through the film itself lamination bond strength after the deep freeze test was measured according to ASTM F0904-98R08. The results are shown in Table 6 below.

Hot Fill and Pasteurization Test at 99° C.

Hot fill and pasteurization is a sterilization process that is used for many applications. For the relevant laminates construction, pasteurization test was done by preparing 200×100 mm package from the laminate. The package was manufactured from the flexible packaging material as follows:
the package was sealed at three extremities
the pouch was filled with 300 mL of hot water at 99° C. and sealed at the fourth extremity
immersed in 5 L of boiling water at 99° C. for a period of 1 hour
the package was out to room temperature 23-280° C. for 24 hours
the pasteurized package put into carton box.
The package was then visually inspected for detection of:
any detachments between layers which usually would show as "bubbles" on the surface of the package,
change in the colors of the printed picture taking as reference a non-tested sample,
delaminations,
clear separation between layers,
leaks of fluid from the package through sealing border or/and through the film itself,
lamination bond strength after the deep freeze test was measured according to ASTM F0904-98R08. The results are shown in Table 6 below.

Retort Test at 121° C.

Retort is one of the most complicated flexible packaging processes since the whole package is heated to elevated temperature with steam and then cooled back to room temperature under pressure. Retort cannot be met with some existing flexible packaging materials due to primers used having unsuitable water resistance and lamination bond strength values being insufficient. For the relevant laminates construction, retort test was done by preparing 200×100 mm package from the laminate. The package was manufactured from the flexible packaging material as follows:
the package was sealed at three extremities
the pouch was filed with 300 mL of hot water at 85° C. and sealed at the fourth extremity
the filled pouch was placed in an autoclave (Tuttnauer Elara 9i). Next steam flows into the closed chamber, and the autoclave was gradually heated for 30 minutes up to 121° C., with a process of air removal from the chamber. Afterwards the temperature remained at 121° C. for 20 minutes—the sterilization stage.
the package was cooled slowly for 60 minutes, while pressure was exceeded gradually up to 3 bar in order to balance the package pressure during cooling. The cooling stage was stopped when the autoclave temperature reached 85° C., and the pressure was stabilized to atmospheric pressure so the autoclave door could be opened.
The package was then removed from the autoclave and visually inspected for detection of:
any detachments between layers which usually would show as "bubbles" on the surface of the package,
change in the colors of the printed picture taking as reference a non-tested sample,
delaminations,
clear separation between layers,
leaks of fluid from the package through sealing border or/and through the film itself,
lamination bond strength after the deep freeze test was measured according to ASTM F0904-98R08. The results are shown in Table 6 below.

TABLE 6

| Example | Final laminate | Thickness (μm) | Thermally activatable laminating material | Lamination bond strength (N/inch) | | | | | Visual inspection |
| | | | | After lamination | After Freeze test | After Hot fill | After Hot fill and pasteurization | After retort | after processes |
| --- | --- | --- | --- | --- | --- | --- | --- | --- | --- |
| 1 | PET/Ink/TALM/cPP | 12/2/10/70 | Lotryl ® 24MA02 | 5.1 | 5.0 | 4.8 | 4.8 | — | Good |
| 2 | PET/Ink/TALM/PE | 12/2/10/80 | Lotryl ® 24MA02 | 5.7 | 5.8 | 5.3 | 5.3 | — | Good |
| 3 | PET/Ink/TALM/PE | 12/2/10/80 | Lotader ® 3430 | 7.1 | 7.0 | 6.8 | 6.8 | — | Good |

TABLE 6-continued

| Example | Final laminate | Thickness (μm) | Thermally activatable laminating material | Lamination bond strength (N/inch) | | | | | Visual inspection after processes |
|---|---|---|---|---|---|---|---|---|---|
| | | | | After lamination | After Freeze test | After Hot fill | After Hot fill and pasteurization | After retort | |
| 4 | PET/Ink/TALM/ Al/BOPA/cPP | 12/2/10/7/15/80 | Lotryl ® 29MA03 | 5.7 | 5.4 | 5.4 | 5.3 | 5.0 | Good |
| 5 | PET/Ink/TALM/ PET-SiOx/BOPA/ cPP | 12/2/10/12/15/80 | Lotryl ® 29MA03 | 5.8 | 5.3 | 5.2 | 5.6 | 5.0 | Good |
| 6 | PET/Ink/TALM/ PET-AlOx/BOPA/ cPP | 12/2/10/7/15/80 | Lotryl ® 17BA04 | 5.2 | 5.3 | 5.2 | 5.3 | 5.1 | Good |
| 7 | PET-AlOx/Ink/ TALM/BOPA/cPP | 12/2/10/7/15/80 | Lotryl ® 17BA04 | 5.5 | 5.0 | 5.5 | 5.5 | 5.5 | Good |
| 8 | PET-SiOx/Ink/ TALM/BOPA/cPP | 12/2/10/15/80 | Lotryl ® 17BA04 | 5.7 | 5.6 | 5.7 | 5.3 | 5.4 | Good |
| 9 | BOPP/Ink/TALM/ Met-BOPP | 20/2/10/20 | Tafmer ™ MA9015 | 5.0 | 5.0 | — | — | — | Good |
| 10 | BOPP/Ink/TALM/ BOPP | 20/2/10/20 | Tafmer ™ MA9015 | 4.8 | 4.8 | — | — | — | Good |
| 11 | BOPP/Ink/TALM/ PE | 20/2/10/80 | Tafmer ™ MA9015 | 4.8 | 4.8 | — | — | — | Good |

While the compositions, methods and related aspects have been described with reference to certain examples, those skilled in the art will appreciate that various modifications, changes, omissions, and substitutions can be made without departing from the spirit of the disclosure. It is intended, therefore, that the invention be limited by the scope of the following claims. The features of any dependent claim may be combined with the features of any of the other dependent claims or any and/or any of the independent claims.

The invention claimed is:

1. A process for preparing a flexible packaging material comprising:
   providing a first transparent flexible substrate coated, on a surface, with a primer consisting of poly(acrylic acid) and/or poly(methacrylic acid);
   printing a liquid electrophotographic printing ink composition onto the surface of the first transparent flexible substrate;
   extruding a thermally activatable laminating material onto a surface of a second flexible substrate, wherein the second flexible substrate is separate from the first transparent flexible substrate; and
   contacting, under conditions of temperature greater or equal to 50° C., the surface of the second flexible substrate on which the thermally activatable laminating material is deposited with the surface of the first transparent flexible substrate printed with the liquid electrophotographic printing ink composition, thereby bonding the surface of the second flexible substrate and the surface of the first transparent flexible substrate.

2. The process according to claim 1, wherein the first transparent flexible substrate comprises biaxially oriented polyethylene terephthalate (BOPET), biaxially oriented polypropylene (BOPP), or biaxially oriented polyamide (BOPA) material.

3. The process according to claim 1, wherein the ink composition comprises a copolymer of an alkylene monomer and a monomer selected from acrylic acid and methacrylic acid.

4. The process according to claim 1, wherein the second flexible substrate comprises a film or sheet of paper, metallic foil, and/or a plastic material.

5. The process according to claim 1, wherein the thermally activatable laminating material comprises a copolymer of an alkylene monomer and a monomer selected from acrylic acid and methacrylic acid.

6. The process according to claim 1, further comprising disposing a sealant material onto the second flexible substrate to form a sealant layer disposed on a surface of the second flexible substrate other than the surface on which the thermally activatable laminating material is disposed.

7. The process according to claim 1, wherein the surface of the first transparent flexible substrate printed with the ink composition is contacted with the surface of the second flexible substrate on which the thermally activatable laminating material is disposed, at a temperature of 50-180° C.

8. The process according to claim 1, wherein the surface of the first transparent flexible substrate printed with the ink composition is contacted with the surface of the second flexible substrate on which the thermally activatable laminating material is disposed for a period of 100-600 ms under the conditions of the temperature greater or equal to 50° C.

9. The process according to claim 1, further comprising cooling the material obtained from the step of contacting the surface of the first transparent flexible substrate printed with the ink composition with the surface of the second flexible substrate on which the thermally activatable laminating material is deposited, thereby producing the flexible packaging material.

10. The process according to claim 1, wherein the bonding is immediate so that the flexible packaging material requires no cure time.

* * * * *